March 31, 1931. S. E. SPERRY 1,799,028
MATRIX DISTRIBUTING FOR TYPOGRAPHICAL MACHINES
Filed July 10, 1930 4 Sheets-Sheet 1
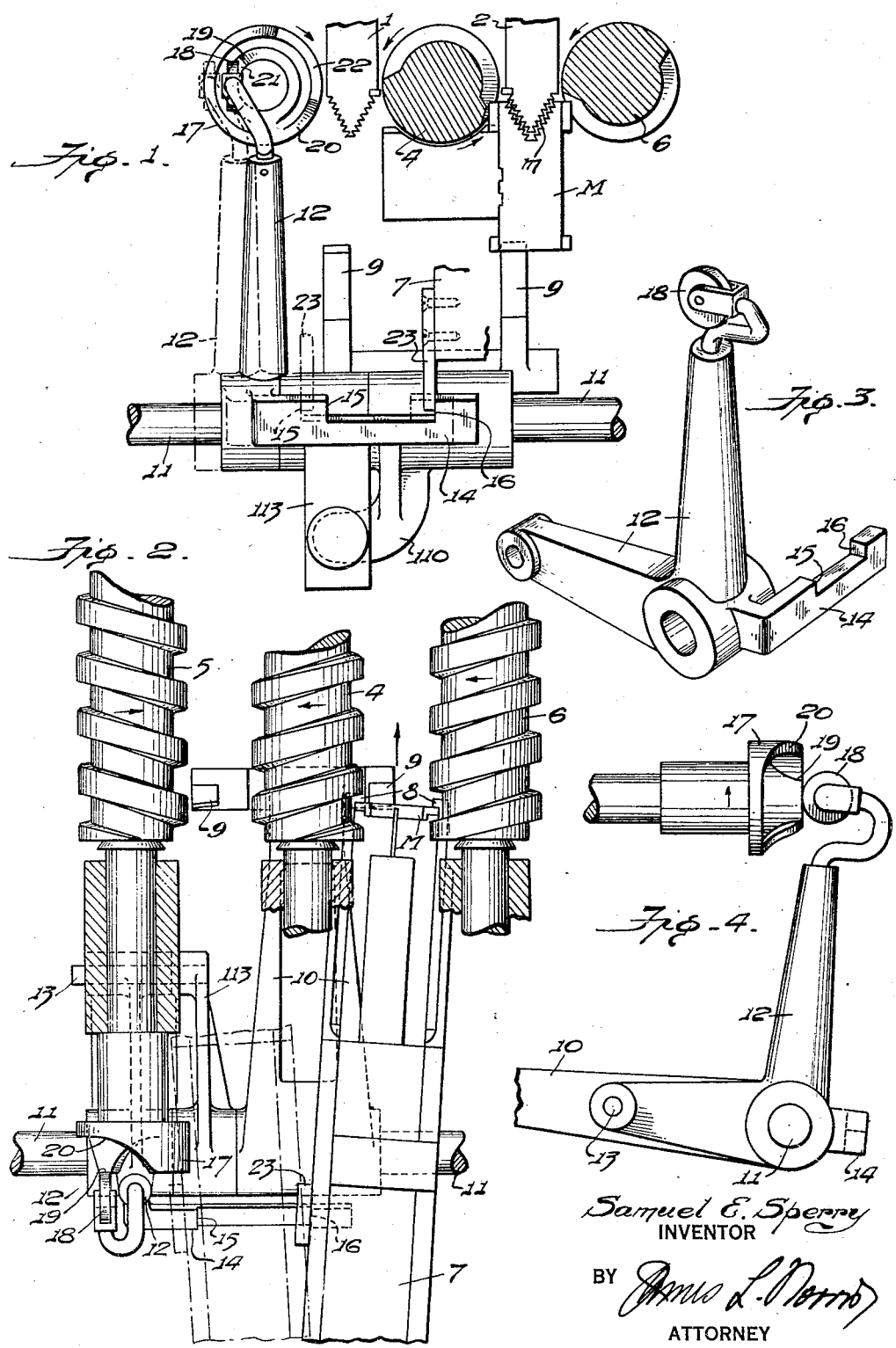
Samuel E. Sperry
INVENTOR
BY
ATTORNEY March 31, 1931.   S. E. SPERRY   1,799,028
MATRIX DISTRIBUTING FOR TYPOGRAPHICAL MACHINES
Filed July 10, 1930   4 Sheets-Sheet 2
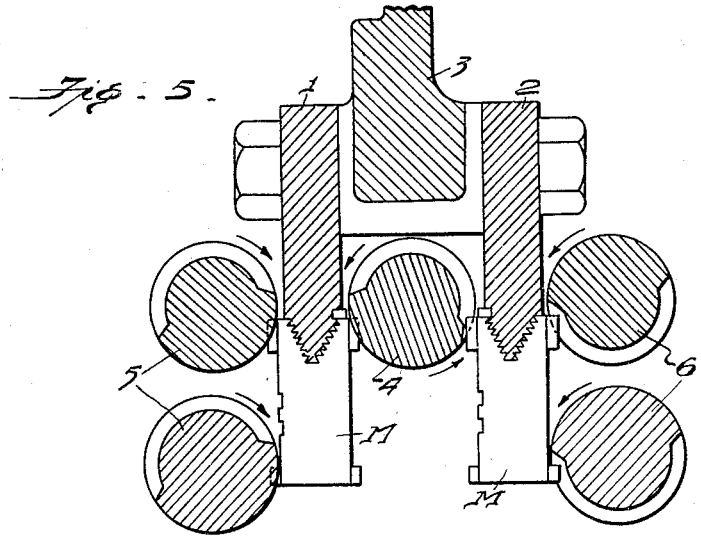
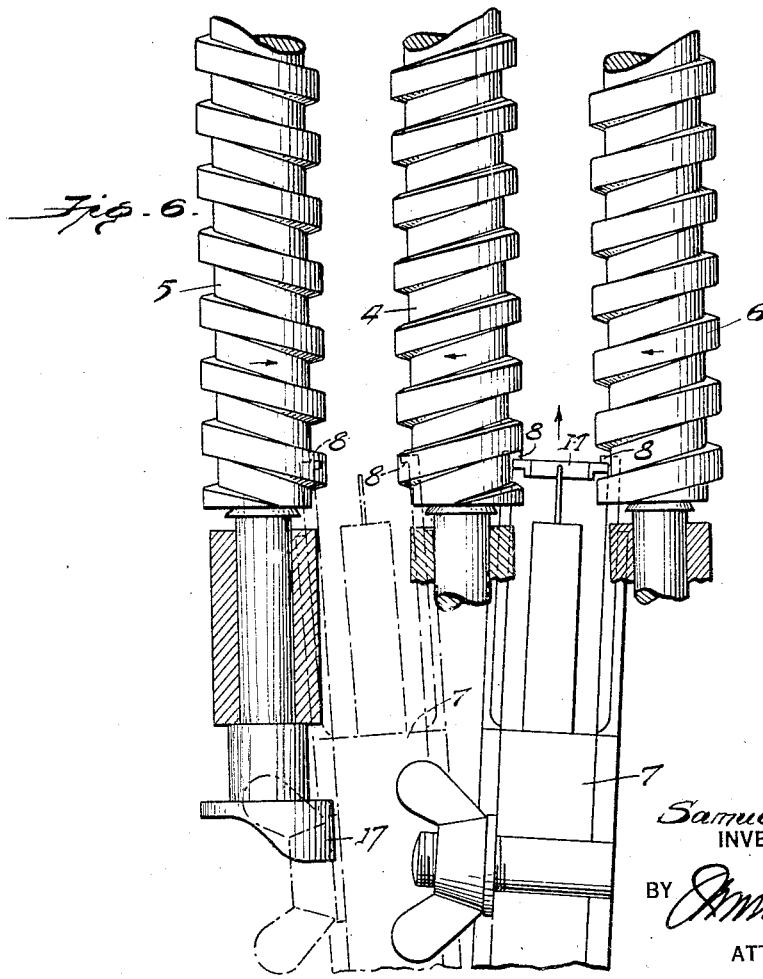
Samuel E. Sperry
INVENTOR
BY
ATTORNEY

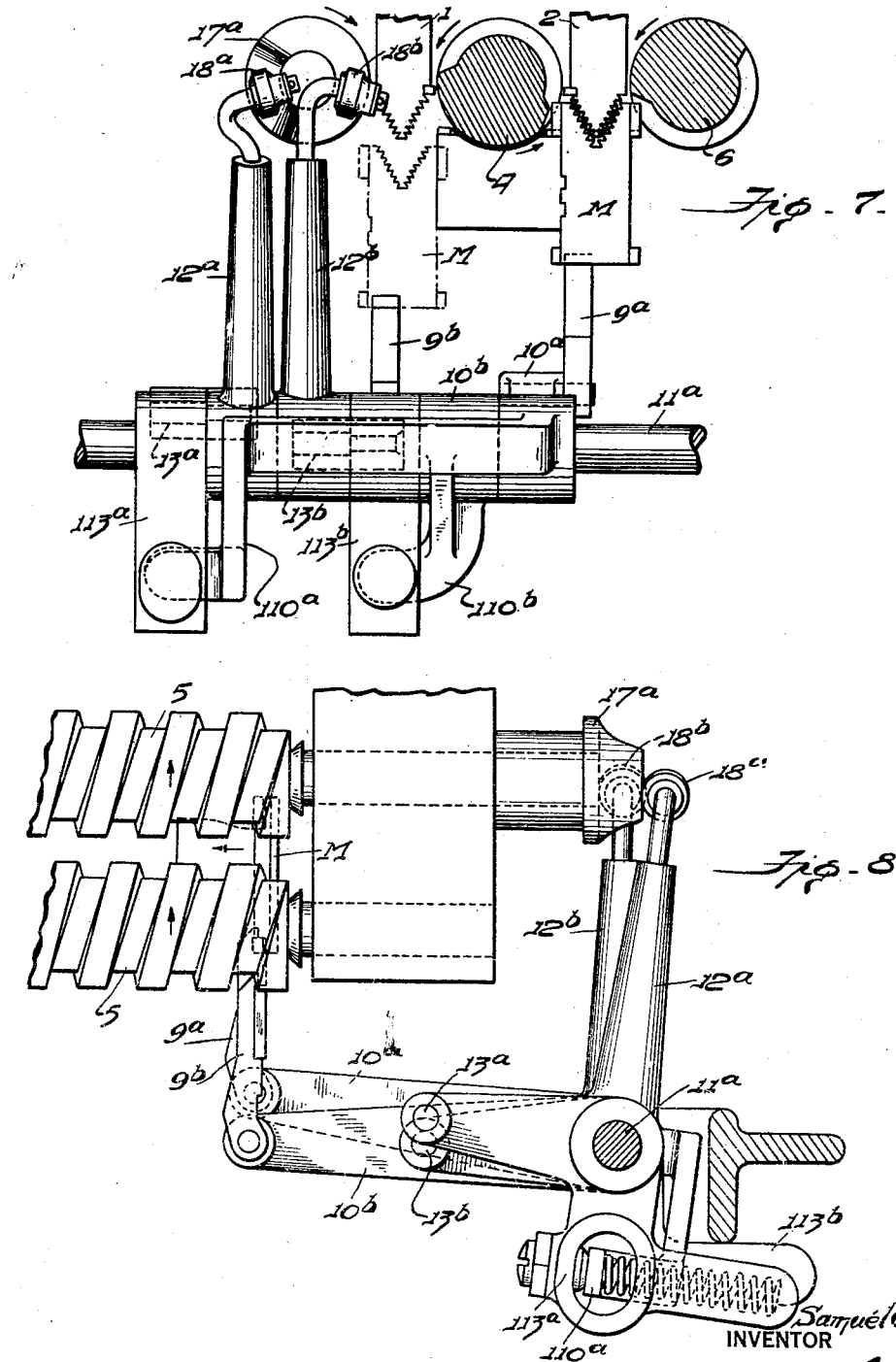

March 31, 1931. S. E. SPERRY 1,799,028
MATRIX DISTRIBUTING FOR TYPOGRAPHICAL MACHINES
Filed July 10, 1930 4 Sheets-Sheet 4

Samuel E. Sperry
INVENTOR
BY
ATTORNEY

Patented Mar. 31, 1931

1,799,028

UNITED STATES PATENT OFFICE

SAMUEL E. SPERRY, OF HOLLIS, NEW YORK, ASSIGNOR TO INTERTYPE CORPORATION, OF BROOKLYN, NEW YORK, A CORPORATION OF NEW YORK

MATRIX DISTRIBUTING FOR TYPOGRAPHICAL MACHINES

Application filed July 10, 1930. Serial No. 467,104.

The present invention relates to typographical machines of the general class shown and described in U. S. Letters Patent No. 436,532 granted September 16, 1890 to O. Mergenthaler, and it relates more particularly to the matrix distributing mechanism of machines of this class which are constructed to contain a plurality of matrix magazines and distributor units for returning the matrices, after each casting operation, to the appropriate channels of the respective magazines from which they were drawn, machines of this class being generally known as "mixer" machines, examples of which are exemplified in U. S. Letters Patents No. 848,771 granted April 2, 1907 to J. R. Rogers and No. 1,202,719 granted October 24, 1916 to T. S. Homans.

Distributing mechanisms for machines of this class usually employ sets of conveyor screws in the different distributor units for conveying the matrices along the usual combination bars to the points where they drop to enter the appropriate channels in the respective magazines, one conveyor screw being usually common to the adjacent distributor units, the matrices being lifted from a distributor box into engagement with the screws by a lifting member reciprocating vertically at a uniform rate in relation to the rotation of the screws, but difficulties have been experienced in causing the matrices to enter their respective distributor units, and especially in presenting the matrices in exactly correct relation with the threads on the rotating conveyor screws so as to avoid striking of the matrices on the crests or threads of the screws and consequent damage to the matrices, this difficulty arising because of the difference in timing of the screws in the adjacent distributor units, the screws of one distributor unit being timed to conform with that of the thread at one side of the center screw or screw common to the adjacent distributor units and the screws of the other unit being timed in accordance with the thread at the opposite side of such center or common screw. This difference in the timing of the screws in adjacent distributor units, especially in a machine having a single distributor box which swings or pivots to direct the matrices into one or the other of the distributor units, causes interference between the matrices and the threads of the screws in one of the units since, while the lifter for one unit may lift the matrices from the distributor box into the grooves between the threads of the screws in that unit, the matrix lifter will lift the matrices from the distributor box when swung into position to direct the matrices into the other unit so that the matrices will strike the threads of the screws in such other unit, due to the difference in timing of the screws in the different units at opposite sides of the center or common screw.

Attempts have been made to avoid this difficulty, as by cutting away the entering threads of the center screw and of the cooperating screws of one of the distributor units, but the difficulty referred to has not been satisfactorily overcome thereby.

The present invention avoids the difficulty referred to by providing means whereby the matrix lifting means will cause the matrices to be lifted into engagement with the conveyor screws of the respective distributor units in exact and proper timed relation with the rotating conveyor screws in the respective distributor units, the matrices being caused to enter the grooves between the threads of the screws in the respective distributor units, notwithstanding the difference in the timing of the screws in the different units.

In the accompanying drawings,

Fig. 1 represents an end elevation, partly in section, of a distributing mechanism embodying the present invention;

Fig. 2 represents a top plan view, partly in section, of the distributing mechanism shown in Fig. 1, the swinging distributor box for directing the matrices to one or the other distributor unit being shown;

Fig. 3 is a detail perspective view of the matrix lift lever;

Fig. 4 is a side elevation of the matrix lift lever and a portion of the matrix lifter arm and the cam for actuating the lift lever;

Fig. 5 represents a transverse section through the distributing mechanism, showing the conveyor screws in two adjacent distributor units and the center screw common to both units and illustrating the manner in which the matrices are advanced along the combination bars in such units by the conveyor screws;

Fig. 6 is a top plan view of the distributing mechanism shown in Fig. 5, illustrating the swinging distributor box and the manner in which it delivers the matrices to the respective distributor units;

Fig. 7 is a view similar to Fig. 1, showing a modified form of the invention;

Fig. 8 is a side elevation of the matrix receiving end of the distributing mechanism shown in Fig. 7 as viewed from the left thereof;

Similar parts are designated by the same reference characters in the several figures.

Figure 9:
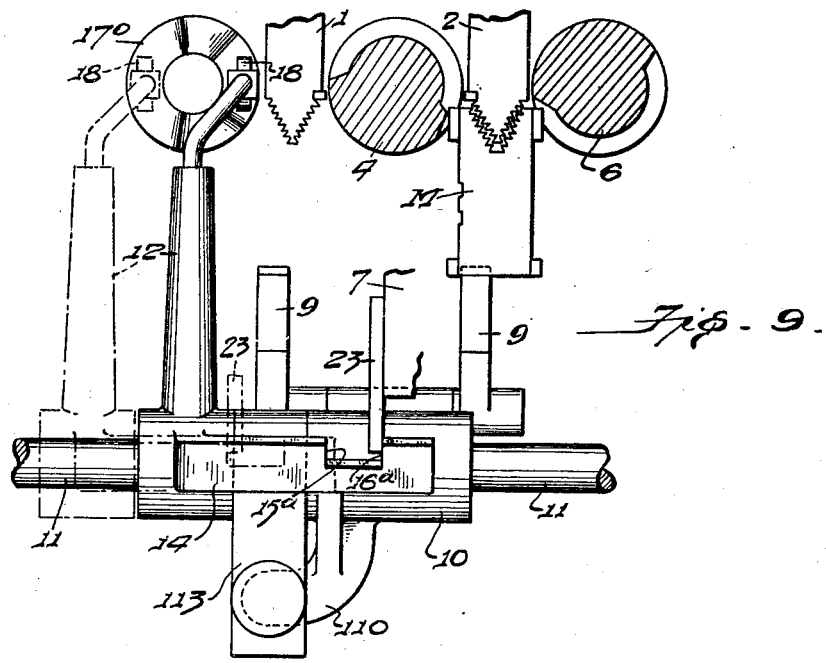
Fig. 9 is a view similar to Fig. 1, showing another modified form of the invention.

Distributing mechanism embodying the present invention is applicable generally to typographical machines of the class hereinbefore referred to and embodying a plurality of magazines to contain different fonts of matrices and from either of which magazines matrices may be drawn for assembly into lines for the casting of type bars or slugs therefrom in the usual or well-known manner, and embodying distributor units for the respective magazines which are arranged one beside the other or in otherwise adjacent relationship, the distributing mechanism being shown in the present instance as applied to a distributing mechanism which embodies two distributor units and having a pivoted or swinging distributor box of the kind shown in the Homans patent hereinbefore referred to, this distributor box receiving the line of matrices after a cast has been made therefrom and directing the matrices into one or the other distributor unit so that the matrices may be returned to the magazines from which they were drawn. The preferred embodiments of the invention are shown in the drawings and will be hereinafter described, but it is to be understood that equivalent constructions are contemplated and such will be included within the scope of the claims.

The distributing mechanism as shown comprises a pair of longitudinally ribbed or toothed combination bars 1 and 2 which may be similar to those commonly used in machines of this class, the matrices M having V-shaped notches in their upper ends which have combination teeth $m$ to engage the ribs or teeth on the combination bars and thereby suspend the matrices while they travel therealong until they reach positions above the entrances to the channels in the magazines in which they belong. The combination bars 1 and 2 thus support the matrices while traveling in two adjacently located distributor units, one for each of two magazines which may be arranged in superposed relation in the machine and provided with the usual channel entrances for directing the matrices, dropping from the respective combination bars, into the respective magazines. The combination bars are fixed to the usual distributor bracket 3 forming part of the main frame of the machine, and this bracket also supports revoluble conveyor screws for advancing the matrices along the combination bars, the conveyor screws comprising usually a center screw 4 which is between the two distributor units and is common thereto, and upper and lower outside screws 5 and 6 for the respective distributor units. The several conveyor screws are revolved continuously, by the usual and well-known gearing, in the directions indicated by the arrows, the threads on the center screw 4 and each of the upper outside screws 5 and 6 being maintained in directly opposite relationship, but since the thread at one side of the center screw 4 is in advance of the thread at the opposite side of this screw to the extent of one-half the pitch of the thread, the timing of the screws in the two distributor units is different to that extent. It will be understood that the conveyor screws advance the matrices along the respective combination bars while suspended therefrom, by the engagement of the threads of the screws with the usual lugs or ears on the matrices while engaged in the grooves between the threads of the screws.

The matrices may be directed into one or the other of the distributor units by a distributor box 7 which may be like that shown and described in the Homans patent above referred to, this distributor box receiving the matrix line after the cast has been made therefrom and being pivoted on a vertical axis so that its matrix delivery end 8 may be brought into position beneath either the combination bar 1 of one distributor unit or the combination bar 2 of the other distributor unit so that the matrices may be directed into the appropriate distributor unit to effect the proper return of the matrices to the magazines in which they belong. Any suitable means may be employed for shifting the distributor box, such for example as that shown in the Homans patent above referred to.

The matrices are lifted from the inner or matrix delivery end 8 of the distributor box into engagement with the conveyor screws and the combination bars by vertically reciprocatory matrix lifting fingers similar to those used in ordinary matrix distributors, but the present invention provides novel and improved means for actuating these matrix lifting fingers so that the matrices will be lifted into engagement with the conveyor screws in the different distributor units in proper timed relation with the conveyor screws therein.

In the embodiment of the invention shown in Figs. 1 to 4 inclusive, a pair of matrix lifting fingers 9 are employed which are carried by a lifting arm 10 so that they will reciprocate vertically and in unison, these lifting fingers being located directly opposite to one another in the respective distributor units and in positions to lift the matrices successively from the matrix delivery end 8 of the distributor box into engagement with the conveyor screws of the respective units. The lifting arm 10 is pivotally mounted on a supporting shaft 11 which in turn is suitably supported in a stationary position on the frame of the machine, and the matrix lift lever 12 is pivotally mounted on the shaft 11 so that it may slide longitudinally thereon, it being operatively connected to the arm 10 by a pin 13 which projects laterally from the lift lever yoke 113 pivotally mounted on the shaft 11 and operatively connected in the usual way by the lug 110 to the lifting arm 10, the pin slidably engaging in the lever 12 and thereby maintaining an operative connection between the lever 12 and arm 10 notwithstanding longitudinal shifting movements of the lever 12 on the shaft 11. The arm 12 has an extension 14 fixed to it and extending in the direction of the length of the shaft 11, and this extension is formed in its upper edge with a notch the ends of which form shoulders 15 and 16, the purpose of which will be hereinafter described.

The matrix lift lever 12 is actuated to cause vertical reciprocatory movements of the matrix lifting fingers 9 by a cam 17 which is driven in proper timed relation with the conveyor screws, it being shown fixed on the end of one of the screws in the present instance, the matrix lift lever 12 being provided at its upper end with a roller 18 to cooperate with the cam. In the form of the invention shown in Figs. 1 to 4 inclusive, the cam 17 is provided with an inside track 19 and an outside track 20, the inside track having its high point 21 located at one side of the center of the cam and the outside track having its high point 22 located at the opposite side of the center of the cam, and the roller 18 on the upper end of the matrix lift lever 12 is adapted to ride on one or the other of these tracks. The cam and cooperating roller are so adjusted that when the roller 18 engages the high part of the inside track 19, as shown by the full lines in Fig. 1, the matrix lifting finger 9 beneath the combination bar 2 will lift a matrix in proper timed relation with the center screw 4 and the outside screw 6 to cause the ears of such matrix to enter the grooves between the threads of these screws; and when the roller 18 on the upper end of the matrix lift lever 12 engages the high part 22 of the outside track 20, as shown by the dotted lines in Fig. 1, the other matrix lifting finger 9 beneath the combination bar 1 will lift a matrix so that its ears will properly enter the grooves between the threads of the center screw 4 and the outside screw 5.

The engagement of the roller 18 on the matrix lift lever with the different tracks on the cam is preferably controlled automatically by the shifting of the distributor box to direct the matrices into one or the other of the distributor units. As shown in the present instance, the shiftable distributor box 7 carries a plate 23 the lower edge of which projects into the notch between the shoulders 15 and 16 on the extension 14 of the matrix lift lever and when the distributor box is shifted to the full line position shown in Fig. 2 to direct matrices to the distributor unit containing the combination bar 2, the plate 23 will come into engagement with the shoulder 16 and will shift the matrix lift lever 12 from the dotted line position to the full line position shown in Fig. 1, thereby removing the roller 18 from the outside track 20 to the inside track 19; and when the distributor box is shifted to the dotted line position shown in Fig. 2 to direct matrices to the distributor unit containing the combination bar 1, the plate 23 will come into engagement with the shoulder 15 on the extension 14 and will shift the matrix lift lever axially along the shaft 11 from the full line position to the dotted line position shown in Fig. 1, thereby transferring the roller 18 from the inside track 19 to the outside track 20 of the cam. Due to the difference in timing of the inside and outside cam tracks and the relationship of the timing thereof to that of the conveyor screws in the different distributor units, the matrix lifting fingers will be caused to reciprocate vertically in proper timed relationship with the timing of the threads on the conveyor screws of the different units, in accordance with the difference in timing of the screws in the different units, thus insuring the lifting of the matrices in each unit at the moment the grooves between the threads of the screws therein are directly above the matrix and in position to receive the ears thereon.

Figure 10:
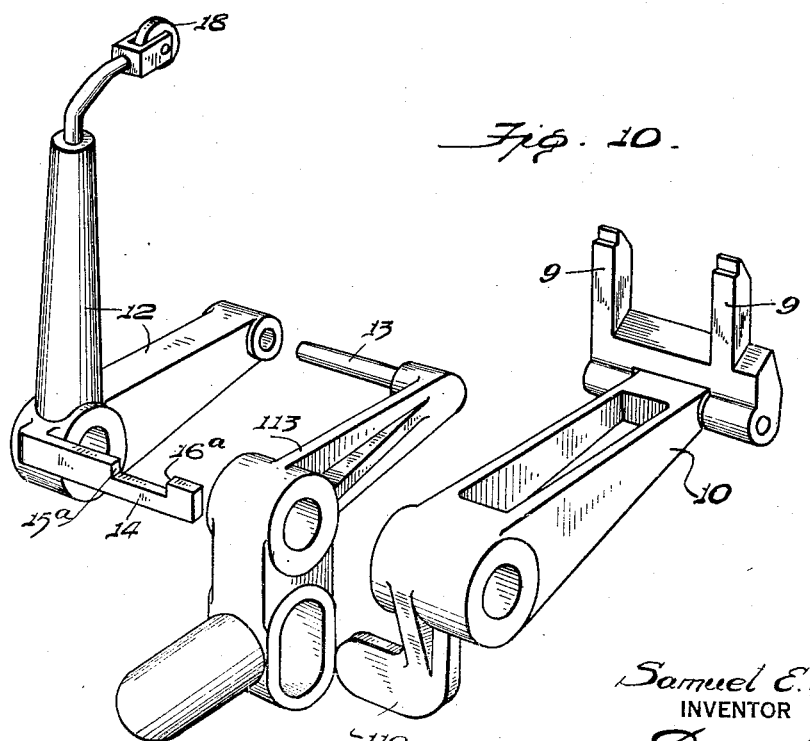
Fig. 10 is a perspective view showing collectively but in relatively separated relation, the parts comprising the matrix lifting means shown in Fig. 9.

Instead of providing the actuating cam with two tracks, it may have a single track as is usually provided, the track extending the full width of the cam face, and the roller 18 on the upper end of the matrix lift lever 12 may be shifted across from one side of the center of the cam to the other side thereof and thereby cause the matrix lifting fingers to be lifted in proper timed relation with the conveyor screws in the different distributor units. Such a construction, similar to that shown in Figs. 1 to 4 inclusive, is shown in Figures 9 and 10, wherein the single track actuating or matrix lifting cam, designated 17°, and which may be fixed to an end of one of the conveyor screws as in the preceding construction, cooperates with the roller 18 on the upper end of the matrix lift lever 12 and the roller 18 is shiftable, under the control of the distributor box, from one side of the cam, diametrically across its center to the opposite side thereof as indicated by the dotted and full line positions in which the matrix lift lever 12 and roller 18 are shown in Fig. 9. The matrix lift lever 12 is shiftable axially along the shaft 11 as in Fig. 1, although to a greater extent, and it is maintained in operative relation with the lifting arm 10 which carries the matrix lifting fingers 9 by the pin 13 which slidably engages the lever 12 and is carried by the lift lever yoke 113 and by the lug 110 on the arm 10 which is operatively connected in the usual way to said yoke, the arm 10 and lever 12 and yoke 113 being rotatably mounted on the shaft 11 and connected to rock in unison under the action of the cam 17° on the roller 18, as in Fig. 1, and thereby causing the matrix lifting fingers to reciprocate vertically and in unison in the different distributor units. The matrix lift lever 12 carries an extension 14 thereon having a notch in its upper edge, as in Fig. 1, but the notch in Figs. 9 and 10 is relatively shorter in length so that the shoulders $15^a$ and $16^a$ formed by the ends thereof are closer together so that the plate 23 carried by the pivoted distributor box and which operates in said notch will shift the lever 12 along the shaft 11, in one direction or the other, sufficiently far to bring the roller 18 into position to bear on the track or face of the cam 17° at the one or the other side of the center of the cam when the distributor is swung into one or the other position to direct the matrices into one or the other of the distributor units, it being understood that the threads of the screws in the different distributor units differ in timing to the extent of one-half the pitch of the threads or in other words, one half a revolution, so that the shifting of the roller 18 to cooperate with the track of the cam at opposite sides of its center will alter the timing of the matrix lifting fingers to conform with the timing of the threads of the distributor screws in the different distributor units, according to the setting of the distributor box, hence insuring the lifting of the matrices in each unit at the moment the grooves between the threads of the screws therein are directly above the matrices and in position to receive the lugs or ears thereon.

In the modification of the invention shown in Figs. 7 and 8, a single track cam $17^a$ is used which is fixed to the end of one of the conveyor screws and a pair of independent matrix lift levers $12^a$ and $12^b$ are employed having rollers $18^a$ and $18^b$ which are positioned to engage the operative face of the cam at different points around its center. The matrix lift levers $12^a$ and $12^b$ are pivoted to rock independently on the shaft $11^a$ and are connected individually to the matrix lifting fingers $9^a$ and $9^b$ for the respective distributor units through the individual lifting arms $10^a$ and $10^b$ which are independently pivoted on the shaft $11^a$ and are connected to the levers $12^a$ and $12^b$ by the pins $13^a$ and $13^b$ respectively which connect said levers to the lift lever yokes $113^a$ and $113^b$ respectively the latter being independently rotatable on the shaft $11^a$ and connected to the lifting arms $10^a$ and $10^b$ respectively by the lugs $110^a$ and $110^b$. Due to the location of the rollers $18^a$ and $18^b$ at different points around the cam $17^a$, the matrix lifting fingers will be caused to reciprocate in relatively reverse or opposite directions, and by timing the lifting fingers so that each will rise while the grooves between the threads of the conveyor screws in the respective distributor units are in line to receive a matrix lifted by such finger, matrices directed to one or the other of the distributing units will be lifted so that they enter the grooves between the threads of the conveyor screws, thus avoiding jamming of the matrices against the threads of the screws.

Each of the constructions hereinbefore described insures lifting of the matrices in one or the other of the distributor units so that the matrices will be engaged by the conveyor screws therein in the grooves between the threads of the screws, notwithstanding the difference in the timing of the screws in the different units, altering of the entering threads of the conveyor screws being unnecessary, the timing of the lift of the matrices into the grooves of the conveyor screw threads being accomplished by simply locating the contacting roller or rollers of the lift lever or levers in proper relation to the high point or points on the lift cam.

I claim as my invention:—

1. In matrix distributing mechanism for typographical machines embodying a plurality of distributor units having differently timed screws for conveying the matrices therein, and matrix lifting means for engaging the matrices with the screws of said units, means for actuating the matrix lifting means in timed relation with the screws of the respective distributor units.

2. In matrix distributing mechanism for typographical machines embodying a plurality of distributor units having differently timed matrix conveyer screws, and matrix lifting means for engaging the matrices with the screws of the respective units, cam means for actuating the matrix lifters in conformity with the timing of the screws of the respective distributor units.

3. In matrix distributing mechanism for typographical machines embodying a plurality of distributor units having matrix advancing screws therein driven in different timed relation and an intermediate matrix advancing screw common to a pair of said units and having its opposite sides in timed relation with the screws of the respective units of said pair, and matrix lifting means for engaging the matrices with the screws of said units, means for directing matrices into one or another of said distributor units, and means for actuating the matrix lifting means in timed relation with the screws of the respective distributor units.

4. In matrix distributing mechanism for typographical machines embodying a plurality of distributor units having matrix advancing screws therein driven in different timed relation and an intermediate matrix advancing screw common to a pair of said units and having its opposite sides in timed relation with the screws of the respective units of said pair, and matrix lifting means for engaging the matrices with the screws of said units, means for directing matrices into one or another of said distributor units, and means controlled by said matrix directing means for actuating the matrix lifting means in timed relation with the screws of the respective distributor units.

5. In matrix distributing mechanism for typographical machines embodying a plurality of distributor units having differently timed matrix advancing screws therein, and matrix lifting means for engaging matrices with the screws of said units, means including a cam and means cooperative with differently timed relations of the cam for actuating the matrix lifting means in conformity with the timing of the screws of the respective units.

6. In matrix distributing mechanism for typographical machines embodying a plurality of distributor units having differently timed matrix advancing screws therein, and matrix lifting means for engaging matrices with the screws of said units, a cam having differently timed tracks therein, and means to cooperate with one or another of said cam tracks to actuate the matrix lifting means in accordance with the timing of the screws of the respective units.

7. In matrix distributing mechanism for typographical machines embodying a plurality of distributor units having differently timed matrix advancing screws therein, and matrix lifting means for engaging matrices with the screws of said units, shiftable means for directing matrices to one or another of said units, a cam having differently timed portions thereon and an actuating member controlled by the shifting of said matrix directing means and cooperative with one or another of said differently timed portions of the cam to actuate the matrix lifting means in accordance with the timing of the screws of the respective units.

8. In matrix distributing mechanism for typographical machines embodying a plurality of distributor units having differently timed matrix advancing screws therein and matrix lifting means for engaging matrices with the screws of said units, a cam having tracks thereon timed in accordance with the timing of the screws of the different units, an actuating member connected to the matrix lifting means and shiftable into engagement with one or another of said tracks to actuate the matrix lifting means, and means operative by the shifting movement of the matrix directing means to shift said member into engagement with one or another of said cam tracks.

9. In matrix distributing mechanism for typographical machines embodying a plurality of distributor units having differently timed matrix advancing screws, matrix lifters for engaging matrices with the screws of the different units, and shiftable means for directing matrices to one or another of said units, a cam having different tracks thereon in timed relation with the screws of the different units, a slide operatively connected to the matrix lifters, and carrying a member to cooperate with one or another of said cam tracks to be actuated thereby, and means for shifting said slide in accordance with shifting of the matrix directing means to bring said member into cooperation with the cam track which is in timed relation with the screws of the unit into which the matrix directing means is set to introduce matrices.

10. In matrix distributing mechanism for typographical machines embodying a plurality of distributor units having differently timed matrix advancing screws, and matrix lifting means for engaging matrices with the screws of said units, an actuating cam for said matrix lifting means having a single track thereon, and means shiftable into positions to cooperate with the track of said cam at different sides of the center thereof for actuating the matrix lifting means in conformity with the timing of the screws of the respective units.

11. In matrix distributing mechanism for typographical machines embodying a plurality of distributor units having differently timed matrix advancing screws, matrix lifting means for engaging matrices with the screws of said units, and shiftable means for directing matrices into one or another of said distributor units, an actuating cam for said matrix lifting means having a single track thereon, and means shiftable by the shifting of said matrix directing means for bringing it into cooperation with the track of said cam at different sides of the center thereof for actuating the matrix lifting means in conformity with the timing of the screws of the respective units.

12. In matrix distributing mechanism for typographical machines embodying a plurality of distributor units having differently timed matrix advancing screws, independently operative matrix lifters for lifting matrices into the respective distributor units, an actuating cam having a track thereon, and independently operative members engaging the track of the cam at relatively different points around its circumference and acting individually on the respective matrix lifters to actuate them in conformity with the timing of the screws of the respective units.

In testimony whereof I have hereunto set my hand.

SAMUEL E. SPERRY.